Patented Jan. 27, 1948

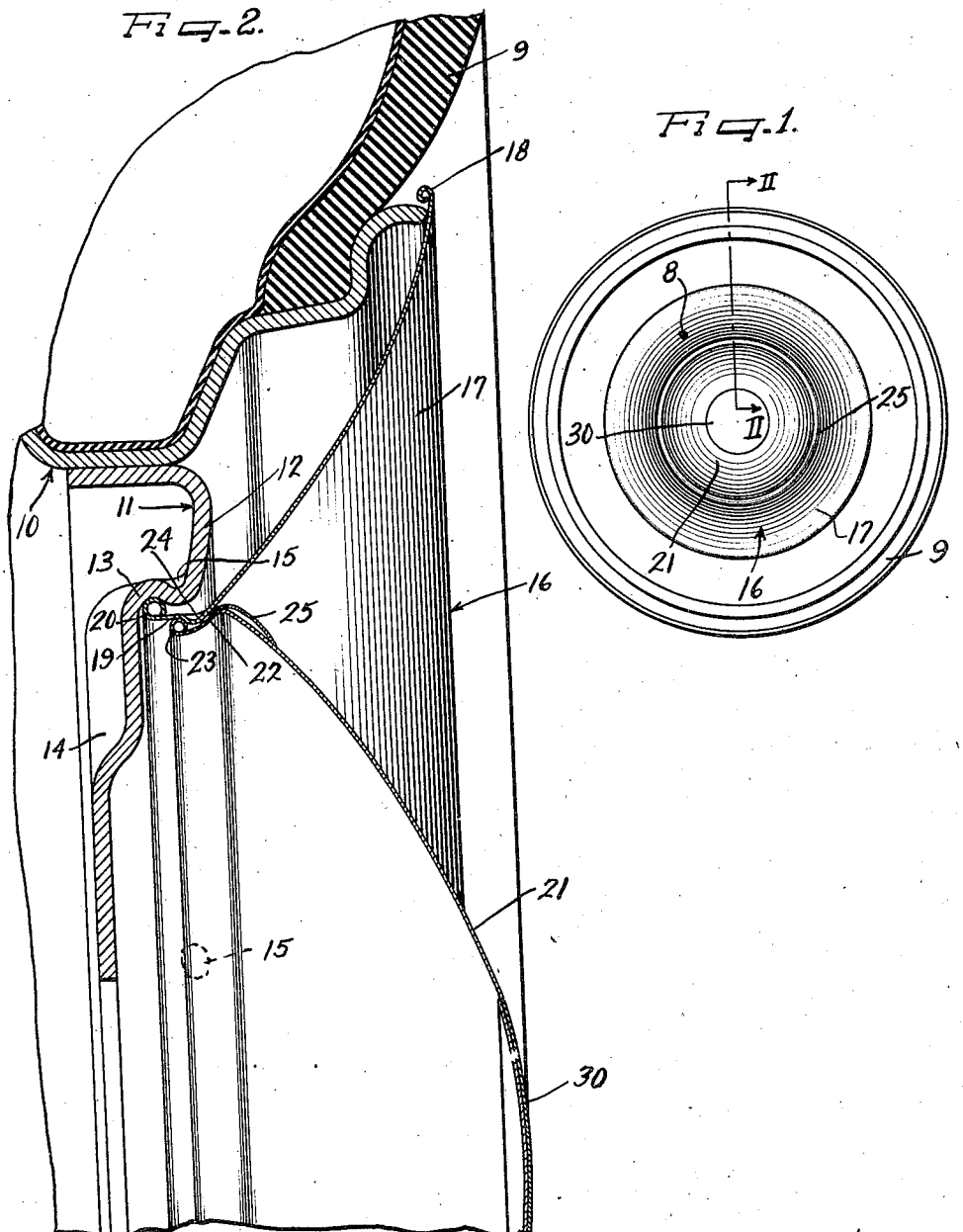

2,434,940

UNITED STATES PATENT OFFICE 2,434,940

VEHICLE WHEEL COVER

George Albert Lyon, Allenhurst, N. J.

Application September 1, 1945, Serial No. 613,995

4 Claims. (Cl. 301—37)

This invention relates to a wheel structure, and more particularly to a novel cover assembly for an outer side of an automobile wheel.

An object of this invention is to provide a highly ornamental, simple multi-part cover assembly which lends itself to economical manufacture on a large production basis and which may be detachably retained in a very simple manner on the wheel.

Another object of this invention is to provide an improved multi-part cover assembly wherein the parts may be collectively removed together as a unit from the wheel or wherein they may be separately removed.

In accordance with the general features of this invention, there is provided in a cover structure for a wheel, including a flanged tire rim and a load bearing body part therefor, having a centrally depressed flange with cover retaining protuberance means, cooperable with a cover assembly; the cover assembly including a radially outer annular cover member, extending radially and axially inwardly on the wheel and into telescoping relation with the depressed flange, the annular member having an axially extending edge portion formed to be snapped over and into retaining cooperation with the protuberance means and a central cover part telescopingly nested in the center of said member and detachably retained therein by means on the member.

Another feature of the invention relates to the clamping of an ornamental bead between the cooperable marginal portions of the outer annular cover member and the central cover part or hub cap.

Other objects and features of this invention will more fully appear from the following detailed description taken in connection with the accompanying drawing, which illustrates a single embodiment thereof, and in which Figure 1 is a side view of a wheel structure having a cover assembly embodying the features of this invention; and Figure 2 is an enlarged fragmentary cross-sectional view taken on substantially the line II—II of Figure 1 looking in the direction indicated by the arrows.

As shown on the drawings:

The reference character 9 designates generally a conventional type of automobile pneumatic tube and tire, mounted on and carried by the usual multi-flanged drop-center tire rim 10. This rim is of the type that is now in extensive commercial use on most automotive vehicles. It is carried by a load-bearing or body part 11 comprising a dished metallic stamping. This body part 11 includes an axially outwardly bulged portion 12, a centrally depressed portion 13 and a radially extending bolt-on flange 14. The flange 14 is adapted to be secured in the usual way to a part on the axle by means of cap screws or bolts (not shown). Such fastening elements must be accessible in order to enable the removal of the wheel from the axle when the occasion arises.

The centrally depressed axially extending flange 13 is provided adjacent the bulged portion 12 with a plurality of equidistantly spaced protuberances 15, which extend radially inwardly toward the axis of the wheel. These protuberances may be of any suitable number, such, for example, as three to five. In this structure, they are employed for the purpose of detachably retaining a wheel cover or trim on the outer side of the wheel.

Cooperable with the aforesaid wheel structure, which embodies a conventional tire rim 10 and a wheel body part of my own design, is a multi-part cover assembly designated generally by the reference character 16. This assembly includes concentric radially outer and inner parts 17 and 21.

Both of these parts may be made of any suitable material, although I preferably contemplate making them of very thin metallic sheet since such material lends itself admirably to blanking of the cover parts on a large production basis in suitable press equipment.

While the part 17 is preferably made of metal, it may, of course, be made of other materials, such, for example, as suitably formed synthetic thermoplastic material. Good results may be obtained by making it of a plastic such as ethyl cellulose, cellulose acetate, or a vinyl resin. I have also attained very excellent results by making this annular part 17 out of stainless steel strip or sheet. The part 17 is generally of a bowed or convex-concave cross sectional contour and extends radially and axially inwardly from its outer turned edge 18 to the body part of the wheel. It will be perceived that the outer margin of this ring or annulus 17 is rolled or turned at 18 so as to slightly overhang the outer edge of the tire rim part 10 in close proximity to the outer side wall of the tire 9.

This arrangement is very desirable in that it enables the ring 17, in use, to appear to constitute a continuation of the side wall of the tire. In other words, an illusion is afforded wherein the tire appears to extend clear down to the central or hub cap part 21 thereby giving the appearance of the wheel having a massive tire. This appearance may be further accentuated by providing the ring 17 with an external white finish in which event it will appear to constitute a white side wall part of the tire.

Attention is directed to the fact that the main body of the ring 17 should be apertured to accommodate the free end of the usual valve stem as designated at 8 in Figure 1. The purpose of this is so that access may be had to the end of the valve stem without necessitating removal of the cover from the wheel.

The inner margin of the annulus or ring 17 is formed into an axially extending flange 19 which telescopes the centrally depressed portion 13 of the body part 11 and terminates in a rolled or turned edge 20 adapted to seat on the body part at the bottom of the flange portion 13. This turned edge 20 is a continuous one and springy enough so that it can be sprung over the high points of the protuberances 15 to a position axially behind the protuberances whereby the cover can be retained on the wheel in a detachable manner. The ring 17 can of course be readily removed from the wheel by pulling or prying it off of the wheel. If the ring 17 is made of metal it may be pried free of the retaining protuberances by a pry-off tool inserted under its outer edge 18. If it is made of a strong enough plastic material, it can be removed by pulling it free of the protuberances. As noted before, however, I preferably make it of metallic sheet.

The other part of the cover assembly comprises the central or hub cap part 21. The purpose of this part is to conceal the center part of the wheel; or in other words, the zone of the wheel where the attaching means are located. This hub cap part 21 has an underturned annular skirt 22 terminating in a rolled or turned edge 23 cooperable with radially inwardly extending protuberances 24 on the skirt or flange 19 of the cover ring 17. The continuous turned edge 23 of the hub cap part cooperates with these protuberances in much the same manner as is true in the case of the turned ring edge 20 and the protuberances 15. Thus, the central hub cap part can be detachably carried on the ring part 17 in telescoping or nested relation therewith. It may be applied or removed from the ring 17 without necessitating removal of the ring. To remove it all that is necessary is to insert a pry-off tool under its outer margin and forcibly pry it free of the retaining protuberances 24.

If it is desired, an intermediate ornamental bead or ring 25 may be located at the junction of the two parts 17 and 21. This ring may be made of any suitable lustrous metal, such, for example, as stainless steel and is preferably of a curved cross-sectional contour as shown in Figure 2. It has a rearwardly extending turned margin adapted to nest over the underturned skirt 22 of the hub cap part 21, so that when the hub cap part 21 is clamped to the ring part 17, it holds the ring 25 tightly against the ring part 17. It is, of course, clear that the contour of this ring 25 is such that it is interlocked to the margin of the hub cap 21 by reason of its being nested over the turned outer margin of the hub cap.

In assembling the cover of my invention, the part 17 is first placed over the wheel with its aperture aligned with the valve stem 8, and is then pressed axially home until its turned edge 20 is bottomed on the flange 13 axially behind the protuberances 15. In other words, it is snapped into detachable retaining cooperation with the wheel body part 11.

Thereafter, the central hub cap part 21 is aligned with the center portion of the ring part 17 and is pressed axially home into telescoping retained cooperation therewith as previously described. The removal of these parts from the wheel will be readily understood from the description hereinabove.

One of the advantages of the foregoing structure resides in the fact that the inner margin of the relatively deep outer annular ring part 17 can be brought in closer to the medial plane of the wheel thereby enabling a deeper ring 17 to be used.

In addition, the type of retention employed in this structure enables the hub cap 21 to be brought into closer relationship to the medial plane of the tire so that when this part is in position, it is symmetrically associated with the part 17. As a matter of fact, as is clear from the section in Figure 2, the two parts 17 and 21 comprise divergent surfaces which afford the basis for a highly pleasing contrasting color effect. One very pleasing color effect may be obtained by the ring part 17 having a white external finish, the bead 25 having a lustrous finish and the main body of the hub cap part 21 having a dark or color finish, such, for example, as that used on the body of the vehicle. It will also be perceived that the center of the hub cap part 21 may be provided with a suitable emblem 30, such, for example, as is now commonly used on hub caps of automotive vehicles.

Once the cover assembly is on the wheel, the ring part 17 is held in tight stressed engagement with the edge of the tire rim 10 and the centrally depressed portion 13 of the wheel body part. This affords a very substantial footing or backing for the ring 17 so that it can properly receive and retain the hub cap part 21 in a tight and firm relation thereto.

The hub cap 21 can be separately removed, if same is so desired, by inserting an end of a screw driver between bead 25 and ring 17 and by forcibly prying the cap 21 and ring 25 from retained cooperation with protuberances 24.

I claim as my invention:

1. In a cover structure for a wheel, including a flanged tire rim and a load bearing body part therefor having a centrally depressed flange with generally radially inwardly projecting protuberance means, a cover assembly retainingly cooperable with said means, comprising a radially outer annular cover member, extending radially and axially inwardly from an outer edge of the rim over the flanges thereof and into telescoping relation with said depressed flange, said annular member having an axially extending edge portion formed to be snapped over and into retaining detachable cooperation with said protuberance means, and a central cover part telescopingly nested in the center of said member, said member having retaining means for detachably holding said central part in cooperation therewith.

2. In a cover structure for a wheel, including a flanged tire rim and a load bearing body part therefor having a centrally depressed flange with generally radially inwardly projecting protuberance means, a cover assembly retainingly cooperable with said means, comprising a radially outer annular cover member, extending radially and axially inwardly from an outer edge of the rim over the flanges thereof and into telescoping relation with said depressed flange, said annular member having an axially extending edge portion formed to be snapped over and into retaining detachable cooperation with said protuberance means, a central cover part telescopingly nested in the center of said member, said member having retaining means for detachably holding said central part in cooperation therewith, and an ornamental annular bead over an outer margin of said central part and held between said margin and a radially inner margin of said annular member.

3. A wheel cover assembly comprising a radially outer annular cover member, having an axially rearwardly turned inner margin formed into an annular continuous resilient shoulder cooperable with retaining means on a wheel and a central cover part telescopingly nested in the center of said member, axially outwardly of said shoulder, said member having axially inwardly facing retaining protuberance means for detachably holding said central part in cooperation therewith.

4. A wheel cover assembly comprising a radially outer annular cover member, having an axially rearwardly turned inner margin formed into an annular continuous resilient shoulder cooperable with retaining means on a wheel, a central cover part telescopingly nested in the center of said member, axially outwardly of said shoulder, said member having axially inwardly facing retaining protuberance means for detachably holding said central part in cooperation therewith, and an ornamental annular bead over an outer margin of said central part and held between said outer margin and a radially inner margin of said annular member.

GEORGE ALBERT LYON.

REFERENCES CITED

The following references are of record in the file of this patent:

UNITED STATES PATENTS

| Number | Name | Date |
|---|---|---|
| 1,965,529 | Lyon | July 3, 1934 |
| 2,183,220 | Horn | Dec. 12, 1939 |